(12) United States Patent
Ernst et al.

(10) Patent No.: US 8,446,637 B2
(45) Date of Patent: May 21, 2013

(54) ESTIMATION OF INK/TONER COVERAGE WHEN PRINTING

(75) Inventors: Larry M. Ernst, Longmont, CO (US); Nenad Rijavec, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 0 days.

(21) Appl. No.: 13/607,951

(22) Filed: Sep. 10, 2012

(65) Prior Publication Data

US 2013/0003092 A1    Jan. 3, 2013

Related U.S. Application Data

(63) Continuation of application No. 11/233,213, filed on Sep. 22, 2005, now Pat. No. 8,289,572.

(51) Int. Cl.
*G06F 15/00*        (2006.01)

(52) U.S. Cl.
USPC .......... 358/1.9; 358/3.24; 358/1.15; 358/1.16; 358/501; 358/504; 358/530; 358/539; 358/401; 382/233; 382/235; 382/245; 382/246

(58) Field of Classification Search
USPC .............. 358/1.9, 3.24, 1.15, 1.16, 501, 504, 358/530, 539, 401; 382/233, 235, 245, 246
See application file for complete search history.

(56) References Cited

FOREIGN PATENT DOCUMENTS

| | | |
|---|---|---|
| JP | 5134550 | 5/1996 |
| JP | 2005-062755 | 3/2005 |
| JP | 2006-195246 | 7/2006 |

*Primary Examiner* — Vu B Hang
(74) *Attorney, Agent, or Firm* — Duft Bornsen & Fettig, LLP

(57) ABSTRACT

In summary, the present invention provides a method, apparatus and program product for calculating an estimate of the amount of toner coverage required for printing print data defined in a compressed data stream. The estimate is obtained with reduced processing by obtaining coverage data from a partially decompressed formed of the data stream and using this to obtain the coverage estimate, thus removing the need to do a full de-compression of the data stream. For example the coverage data is a count of toned pixels for at least one intensity level.

20 Claims, 3 Drawing Sheets

ESTIMATION OF INK/TONER COVERAGE WHEN PRINTING

RELATED APPLICATION

The patent application is a continuation of a U.S. patent application having the Ser. No. 11/233,213, and filed on Sep. 22, 2005 now U.S. Pat. No. 8,289,572, which is incorporated by reference herein.

BACKGROUND OF THE INVENTION

Field of the Invention

The present invention relates to the field of printing and more particularly to estimating an amount of marking material, such as toner or ink, required for printing a data stream.

In the field of printers and printing it is useful to estimate an amount of marking material such as toner or ink required for the printing of a print job. For example this can be used to estimate a cost for the job, to control supply the printing material during printing, and/or to track usage so that a prediction of when a supply of marking material will run out can be provided to a user. Further some printers may have a limitation on the amount of marking material they can use in printing, for example due to fuser or ink drying issues. For such printers an ink/toner usage estimation can be used to determine whether or not a printer is capable of printing a particular job.

There are alternative methods in the art which are used for estimating ink/toner usage. In particular, one method employed is to determine a number of toned (set) pels/pixels of output required by a print job and then calculate how much ink/toner is required to output the number of toned pels/pixels. Indeed there are several examples in the prior art of where such a method of estimation is used.

For example, U.S. Pat. No. 5,636,032 to Xerox Corp. discloses counting the number of pixels to be printed in a print job in order to estimate ink/toner usage information. The ink/toner usage information is then used to provide details of a number of pages remaining in the toner/ink supply. In this solution the count of pixels is obtained whilst printing by monitoring the firing signal sequence of an optical raster output scanner or thermal inkjet cartridge during the printing process.

For example, U.S. Pat. No. 5,802,240 to Lexmark International Inc. discloses counting the number of pels for each page of a print job in order to estimate toner usage information. The toner usage information is used for comparing the amount of toner used by different print jobs. In this solution the count of pels is also obtained whilst printing a job but in this case by counting output signals with the upper bit set.

For example, U.S. Pat. No. 6,456,802 to Hewlett-Packard Co. also discloses counting the number of pixels in a print job in order to obtain toner usage information. The toner usage information is used for tracking the amount of toner remaining in a toner cartridge. In this solution the pixel count is obtained during printing by counting each pixel that is printed.

Note that in each of these methods the pel/pixel count is obtained during the actual printing process and as a result these methods are not suitable for applications where an advance (pre-printing) knowledge of ink/toner usage is required. For example, such advance knowledge is useful when determining if a printer is capable of printing a print job.

However, for example, U.S. Pat. No. 5,937,225 to IBM Corp. also discloses counting the number of toned pixels in a print job in order to obtain ink/toner usage information, but in this solution a pixel count is obtained by translating a printer specific data stream into a pixel count. As a result this may be carried out either before or during printing. However, whilst this enables advance knowledge of ink/toner usage to be obtained it also requires the data stream to be rasterized first and this is computationally expensive and therefore undesirable unless the job is to be printed. Note that one problem with estimating marking material usage required for a print job in advance is that a print job generally comprises compressed data. For example well known compression schemes include ITU-TSS T.6 Group 4 for bi-level data, Lempel-Ziv-Welch (LZW) for bi-level or multi-bit data, and JPEG for continuous tone data. It is not possible to determine a pel/pixel count from such compressed data and the decompression process is computationally expensive. However decompression is required for printing and as a result obtaining a marking material usage estimate is delayed to a later point in the printing process after such decompression has been completed.

SUMMARY OF THE INVENTION

It is an object of the present invention to provide a method of estimating marking material, such as toner or ink, usage required for a print job which can be performed in advance of the print job being printed and further does not require full de-compression of compressed data.

In this regard the inventors have realized that it is possible to determine a toned pel count for compressed print data in a print job from a partially decompressed version of the print data. Such partial de-compression is relatively computationally inexpensive compared to full de-compression, and as a result an estimate of marking material can be obtained earlier in the print process than in the prior art.

Accordingly according to a first aspect the present invention provides a method comprising: receiving a compressed data stream comprising print data; performing a partial decompression of the data stream; determining coverage data for the print data using the partially decompressed data stream; and estimating an amount of marking material required to print the print data using the determined coverage data.

According to second aspect the present invention provides a data processing system comprising: at least one processor; and an interface and memory accessible to the at least one processor; the interface for receiving a compressed data stream comprising print data; the at least one processor for performing sub-processes of: performing a partial decompression of the data stream; determining coverage data for the print data using the partially decompressed data stream; and estimating an amount of marking material required to print the print data using the determined coverage data.

According to third aspect the present invention provides a computer program product comprising a program storage medium readable by a computer, the medium tangibly embodying one or more programs of instructions executable by a computer to perform a method comprising: receiving a compressed data stream comprising print data; performing a partial decompression of the data stream; determining coverage data for the print data using the partially decompressed data stream; and estimating an amount of marking material required to print the print data using the determined coverage data.

For example, coverage data could be a count of toned pixels/pels of the print data, and an estimate of marking material is made using an average intensity figure for each toned pixel/pel.

Alternatively, for example, if the device to be used to print the print data supports a plurality of pixel intensities, a count may be made of the number of toned pixels at each of a plurality of intensity levels and the estimate may be made using different intensity levels for different pixels. Optionally such a count of toned pixels at each intensity level makes allowance for other printing effects dependent on the printing device. For example for two toned pixels of a given intensity, a printing device may require less marking material if the pixels are adjacent compared to if they are not. In this case the intensity level determined for a toned pixel is based on the intensity level of the pixel and at least one adjacent pixel.

For example the print data may comprise a single color plane (monochrome) or a plurality of color planes. Preferably, if the print data contains a plurality of color planes, a toned pixel count is obtained for the each of a plurality of color planes.

Optionally the print data which comprises a plurality of color planes may further comprise a plurality of high light color planes. Optionally a toned pixel count can be further determined for a plurality of highlight color planes.

Optionally the estimate of an amount of marking material can be used to determine a cost of printing the print data.

Optionally the estimate of an amount of marking material can be used to determine if a predetermined printing device is capable of printing the print data.

For example, if the data stream is a Group 4 compressed data stream it is partially decompressed into a runs format and coverage data is obtained in the form of a count of toned pixels from the runs format. Further this technique may be used for any compression algorithm which uses an intermediate runs format.

For example, if the data stream is a Lempel-Ziv-Welch compressed data stream it partially decompressed by at least partially recreating the string table for the data stream, the string table comprising a plurality of entries each with an associated string. Coverage data is then obtained by determining a toned pixel count for each string in the string table and using the determined toned pixel counts to determine a toned pixel count for the data stream. Optionally the toned pixel count for a string comprises a count of pixels for each of a plurality of intensities.

For example, if the data stream is a JPEG compressed data stream it is partially decompressed by obtaining DC coefficients for blocks of pixels from the compressed data stream and coverage data is obtained by using the DC coefficients to obtain an average intensity level for the blocks of pixels.

BRIEF DESCRIPTION OF THE ACCOMPANYING DRAWINGS

Some of the purposes of the invention having been stated, others will appear as the description proceeds, when taken in connection with the accompanying drawings, in which:

FIG. 3 illustrates example data stream contents used in partial decompression of a Group 4 compressed data stream;

FIG. 4 illustrates example data stream contents used in partial decompression of a Lempel-Ziv Welch compressed data stream.

DETAILED DESCRIPTION OF PREFERRED EMBODIMENTS

Figure 1:
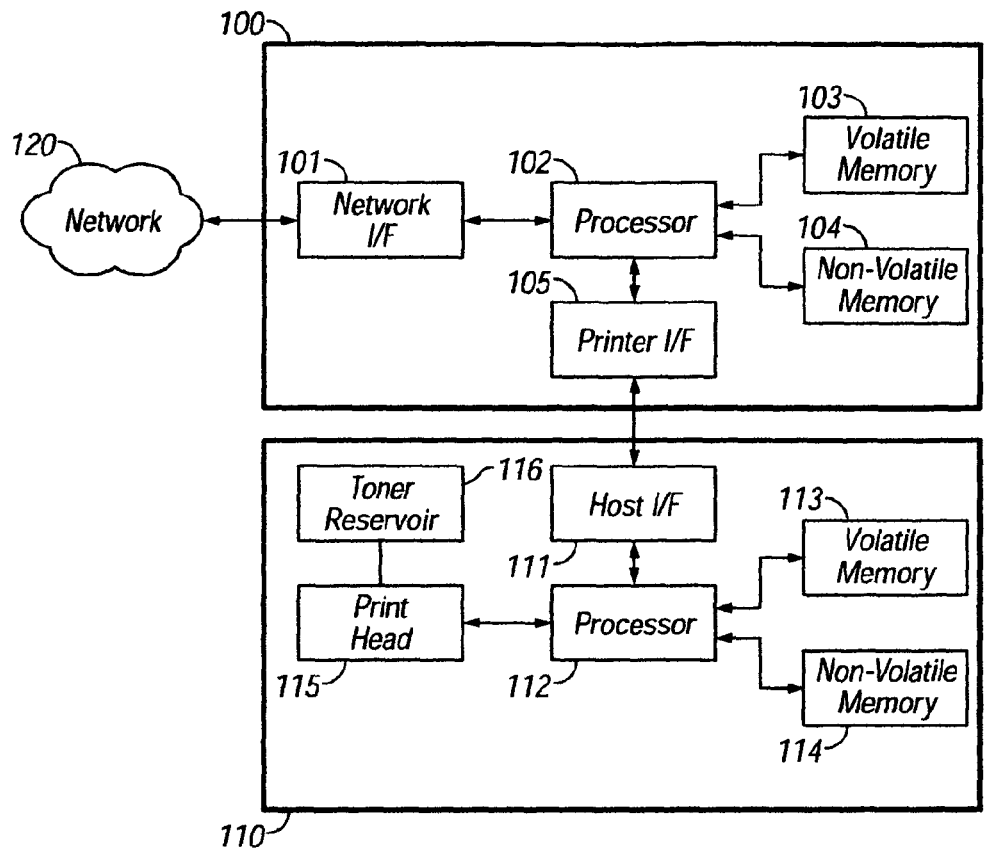
FIG. 1 is a schematic diagram of a printing system in which the preferred embodiment of the present invention will be advantageously applied.

FIG. 1 is a schematic diagram of a printing system in which the preferred embodiment of the present invention will be advantageously applied. The figure shows a printer server 100 and printer device 110. Print server 100 comprises a network interface 101 for access to Network 120, a processor 102 with access to volatile memory 103 non-volatile memory 104, and a printer interface 105 for sending a print request to printing device 110. Printing device 110 comprises a host interface 111 for receiving print jobs from the printer server 100, a processor 112 with access to volatile memory 113 and non-volatile memory 114, a print head 115 for printing the print job and a toner reservoir 116 for use by the print head 115 when printing.

For example, for a prior art print job, print server 100 receives a compressed data-stream comprising print data for printing via the network 120 and network interface 101. Processor 102 maintains the data-stream in volatile memory 103 whilst performing sub-processes comprising decompressing to obtain the print data and rasterizing the print data for sending to the printer. Whilst doing this the processor 102 may access, for example, font information held in non-volatile memory 104. The rasterized print data is then sent to printing device 110 as a print job for printing via printer interface 105. Print device 110 receives the print job via host interface 111. Processor 112 then maintains the print job in volatile memory 113 and provides it in a suitable form for printing by print head 1 15. Whilst doing this, processor 112 accesses such information as paper size from non-volatile memory 114. Print head 115 then prints the print data using toner from toner reservoir 116.

Note that many alternative forms of printing systems are available, for example print server 100 and printing device 110 can be combined into a single unit. Further, for example, printing device 1 10 could include a network interface as an alternative, or in addition, to host interface 111, and receive print jobs via the network. Similarly print server 100 could include a host interface as an alternative, or in addition, to network interface 101, and receive print jobs via the host interface. Further, for example, either device could include one or more additional processors.

Figure 2:
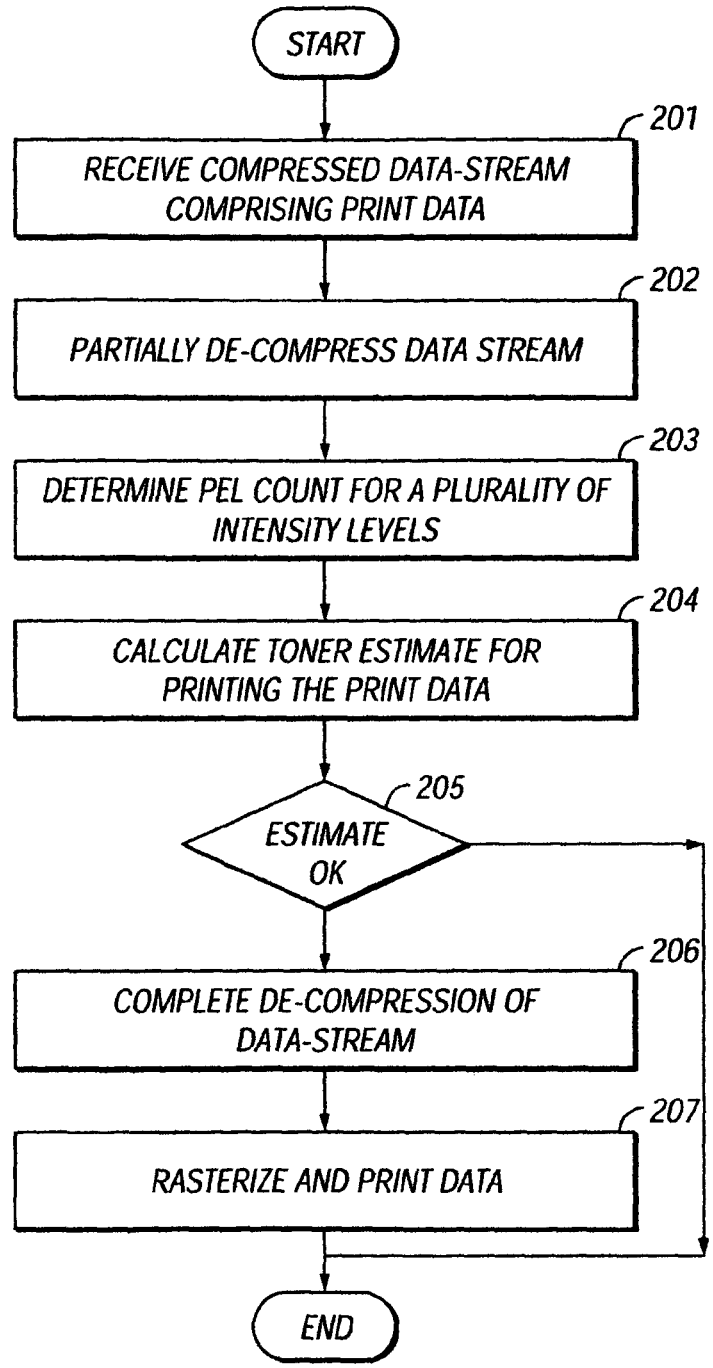
FIG. 2 is a flow chart of obtaining an estimate of marking material from a compressed data stream.

According to the preferred embodiment of the present invention, print server 102 performs the method shown in FIG. 2. At step 201 a compressed data-stream comprising print data for printing at a target device is received via network interface 101. The data-stream is then partially decompressed at step 202 and from this, at step 203, coverage data for the print data is determined comprising a toned pixel count for one or more intensity levels as supported by the target device and/or provided in the print data. At step 204 an estimate of the toner required to print the print data at the target device is calculated by summing the results of multiplying each pixel count with a toner value which represents the amount of toner required to print a single pixel at the intensity associated with the pixel count. Having calculated the estimate, at step 205 it is determined whether or not this meets a pre-determined criteria. For example, the estimate may be a toner amount and the criteria may represent a maximum amount of toner to be used for a print job. Alternatively, for example, the estimate could be a cost for the toner required and the criteria an amount of money available for printing the print job. If the predetermined criteria is not met processing of the print job ends, however if it is met, at step 206 compression of the data stream is completed to obtain the print data and at step 207 the print data is rasterized and sent to the target device for printing.

Note that the amount of toner required to print a pixel will depend upon the total number of pixels to be printed in a given area of print and as a result the toner value used will depend on the total number of pixels and the size of the area into which they are to be printed.

The number intensity levels for which a pixel count is obtained is dependent on the toner values available for the printing device to be used for printing the data-stream and the accuracy of the estimate required.

For example, for a given printer, a single toner value may be available which represents the average amount of toner used to print a pixel. In this case the estimate is calculated as a count of toned pixels multiplied by the average toner value. However, whilst this is a relatively simple calculation, the estimate produced is relatively inaccurate. Alternatively, a relatively better estimate can be obtained if a plurality of toner values are available, for example, each of which represent the average amount of toner used to print a page for different toned pixel coverage. For example for a particular device at 5% coverage (i.e.: 5% of pixels on a page are toned) a first toner value is specified, at 10% coverage a second toner value is specified, and so forth. In this case the coverage of pixels on a page is calculated and the appropriate toner value used to arrive at the estimate. Further if the determined coverage falls between two coverage amounts for which a toner value is available, a weighted average of the two toner values may be calculated.

Alternatively, for example, consider a printer which is capable of printing at 5 intensity levels, namely 20%, 40%, 60%, 80% and 100% and a toner value is known for each of these intensity levels. For a relatively coarse estimate a single count of toned pixels is obtained and multiplied by a toner value which represents the average intensity, for example either the 60% intensity toner value or an average of the 5 toner values. For a more accurate estimate a count of toned pixels at up to 5 of the 5 intensity levels is obtained and multiplied by the appropriate intensity toner value.

However, the amount of toner required to print a pixel can depend on which and how many adjacent pixels are also to be printed. For example if a 3.times.3 block of pixels is printed at 100% intensity, the centre pixel does not require as much toner as the outer pixels, and further the outer pixels do not require as much toner as a single pixel printed at 100% intensity but with no adjacent toned pixels. Therefore a relatively better estimate can be obtained by taking such effects into account but at the expense of increased and more complex computational requirements.

Accordingly a skilled person will realize different techniques can be used to obtain different quality estimates and the technique selected can be a balance between the accuracy of the estimate required for the use to which it is put and the computation resources available for the calculation.

A preferred embodiment for obtaining for obtaining coverage data comprising a pixel count will now be described for each of three well known compression schemes: ITU-TSS T.6 Group 4 for bi-level data; Lempel-Ziv-Welch (LZW) for bi-level or multi-bit data and JPEG for continuous tone data. However a skilled person will realize that the invention could equally be applied to other compression schemes, such as JBIG2, Run Length Encoding (RLE), Packbits and JPEG2000.

ITU-TSS T.6 Group 4 (Group 4) is an example of a bi-level compression algorithm. Bi-level compression algorithms are used for bi-level data in which each pixel can be either "0" or "1". Accordingly it is only possible to obtain a pixel count for a single intensity level and as a result to calculate coverage data for a bi-level image, for example, the number of "1" pixels is counted and compared with the image size.

The Group 4 algorithm can be treated as a two stage scheme. In the first stage print data, such as a bitmap of an image, is converted to a runs format, and in the second stage the runs format is compressed to a final Group 4 form. A runs format encodes a sequence of pixels that are all 0 or all 1 and can be stored as either run lengths or run ends. Decompression is the reverse of this process.

For example, FIG. 3 shows a simple image bitmap 301 and a hexadecimal run end format 302 of the bitmap. The image bitmap 302 shows a 4.times.16 bi-level image with a black 2.times.8 area in the bottom right corner. The run-end format 302 is made of a sequence of two byte shorts each line representing a line of the image bitmap 301. For a given line the first two byte short represents the length of the image line in bytes, and then alternate two byte shorts represent the positions of the end of the sequences of "1"s and "0"s respectively, the end of the line being indicated by a repeated end position. For example the fourth line of the bit map image in run-end format comprises: a length of "00 10" (310) which is 16; the position of the end of the first sequence of "1"s "00 00" (311) which indicates that the line does not start with "1"s; the position of the end of the next sequence of "0"s "00 08" (312) which indicates that the line starts with 8 "0"s; the position of the end of the next sequence of "1"s "00 10" (313) which is 16; and the previous position repeated "00 10" (314) to indicate the end of the line.

According to the preferred embodiment of the present invention, in order to obtain a pixel count for a Group 4 compressed image the compressed image is partially decompressed to obtain details of the runs. From this, the lengths of each run of "1"'s can be obtained and added to obtain a toned pixel count. This is computationally faster than fully decompressing the image and then calculating a number of pixels from the bitmap. Once a toned pixel count has been obtained an estimate of toner/ink is calculated.

Note that in other bi-level compression algorithms it is also possible to partially de-compress to obtain details of the runs. Further note the run-end format shown in FIG. 3 is an example, and a skilled person will realize that many different run formats are possible.

Lempel-Ziv-Welch (LZW) compression is a multi-level compression algorithm and as a result may include pixels of different intensities. LZW compression involves creating a string table and a codeword stream from print data to be compressed. Each entry in the string table comprises a string from the print data and an associated codeword. The codeword stream comprises the sequence of the codewords which define the print data being compressed. Accordingly during compression byte strings are effectively replaced with codewords each codeword representing a string of one or more bytes. For example, during compression the first occurrence of a byte string is copied into the string table and is associated with a codeword. Now a subsequent occurrence of the same byte string is replaced by a reference to the codeword. Further a new byte string may be replaced by a reference to a previous codeword (a prefix) followed by an additional byte, this resulting in creation of a new codeword and a new entry in the string table. When the data is decompressed the string table is recreated and references to code words replaced by the byte strings which they represent.

There are many variations in LZW algorithms and these may vary according to the form of data to be compressed. An example of one such LZW algorithm will now be described with reference to FIG. 4. FIG. 4 shows sample print data comprising hexadecimal image data 401, which when compressed is represented by string table 402 and code stream 403. The image data 401 represents a 8.times.4 image with a single intensity black 2.times.4 area in the bottom right corner, represented by "ff"s in the image data.

During LZW compression the string table is first initialized with all possible single character values. In many applications this will result in 256 entries, one for each possible single byte value, but for simplicity in this example the set of possible values are limited to "00" and "ff". As a result the first two entries in the string table 402 contain these characters and are associated with codewords 00 and 01, respectively. At this stage, in this example, these are the only two entries in the string table 402. Note that in many applications the string table is now followed by one or more reserved entries, but no reserved entries are used in this example.

The image data 401 is then processed by reading the first character which is "00" and using this as a search string to search the string table. This is found in codeword 00 and so the next (2.sup.nd) character from the image data is added to the search string, to give "00 00", and the string table re-searched. This time the string is not found in the table so it is added to the table as codeword 02, the codeword 00 for the last string found is added to code stream 403, and a new search string is created which comprises that last character added to the previous search string and the next (3.sup.rd) character in the image data. In this case the new search string is "00 00" (the 2.sup.nd and 3.sup.rd characters of the image data) and this is found in the table in codeword 02. As a result the next (4.sup.th) character from the image data is added to the search string to give "00 00 00" and the string table re-searched. This time the string is not found in the table so it is added to the table as codeword 03, the codeword 02 for the last string found is added to code stream 403, and a new search string is created which comprises that last character added to the previous search string (the 4.sup.th character of the image data) and the next character (5.sup.th) in the image data. This process then continues adding one new byte from the image data to the search string until it is not found in the string table, at which point the search string is added to the string table, the codeword of the previous found string is added to the code stream and a new search started using the last added byte to the search string and the next byte from the image data. If this process is completed for image data 401, string table 402 and code stream 403 are created, and from these the LZW compressed data stream comprises the code stream 403 and optionally sufficient information to recreate the string table in its initialized form, that is, with entries for code words 00 and 01 only.

Decompression of an LZW compressed data stream comprises recreation of the string table, and use of the recreated string table and code stream to recreate the print data. These two tasks may be performed in parallel. However, according to the preferred embodiment of the present invention a partial decompression is performed in order to determine coverage data comprising a toned pixel count, the partial de-compression comprising recreating the string table. Once the string table has been created a coverage estimate is obtained by associating a toned pixel count, optionally for each of a plurality of intensity levels, with each codeword in the string table, and using these counts to calculate a toned pixel count for the code stream.

To recreate the string table it is firstly initialized with all possible single character values, this information either being received in the compressed data stream or previously known to the de-compressor. The first codeword is read from the code stream and found in the string table. Each subsequent codeword is then read and processed in order, the action taken depending on whether the codeword exists in the string table or not. If the codeword exists in the string table a new entry is added to the string table, using the next free codeword, the string value comprising the value of the previously processed codeword appended with the first character of the codeword being processed. If the codeword does not exist in the string table it is added to the string table with a string value comprising the value of the previously processed codeword appended with the first character of the previously processed codeword.

For example referring to FIG. 4 the string table is created by firstly initializing the string table 402 to comprise the characters "00" and "ff". As a result the first two entries in the string table 402 contain these characters and are associated with codewords 00 and 01, respectively. The code stream 403 is then processed by reading and processing each codeword in turn. The first codeword 00 exists in the string table and no action is taken. The next codeword 02 is not in the string table and so it is added to the string table as the value ("00") of the previously processed codeword (00) appended with the first character ("00") of the previously processed codeword (00), this giving "00 00". This process continues to build code words 03, 04, and 05 from the code stream in the string table, each not already existing in the string table, until the second 05 codeword is read. In this case the codeword is already in the string table so a new codeword is added to the string table using the next free codeword, which is 06, with the value ("00 00 00 00 00") of the previously processed codeword (05) appended with the first character ("00") of the codeword (05) being processed, thus giving "00 00 00 00 00 00". The rest of the codewords are then processed as described depending on whether they already exist in the string able, until the complete string table 402 is built.

According to the preferred embodiment of the present invention coverage data is obtained by associating a toned pixel count for each of one or more intensity levels with each codeword in the restructured string table. The number of intensity levels for which toned pixel counts are obtained being dependent on the number of intensity levels specified in the print data and/or the number of intensity levels supported by the target device. In the example of FIG. 4 the print data includes a single intensity level, each "ff: being 1 pixel, and as a result a toned pixel count for the print data can be calculated by summing the toned pixel counts for the code words in the code stream without needing to re-create the print data. For example in Table 402 of FIG. 4, codewords 01, 07, and 11 comprise 1 pixel, and codewords 08, 09 and 12 comprise 2, 3 and 4 pixels respectively. The code stream 403 comprises: three 01 codewords totaling 3 pixels; one 08 codeword comprising 2 pixels; and one 09 codeword comprising 3 pixels. Thus the total pixel count is determined to be 8 without fully decompressing the compressed data stream.

Note that in table 402 each codeword added can be represented by another codeword and an additional character, for example codeword 05 could be represented as codeword 04 plus an additional "00" character. Similarly toned pixel counts for a codeword can be the toned pixel count of the additional character and the toned pixel count of the other codeword.

Further note that in another example the image data 401 could comprise additional values, each value indicating a different level of pixel intensity or color such as will be required for grey scale and color images. In this case the pixel count can be modified to allow for different intensity of pixels.

JPEG algorithms are based on a two-step compression and de-compression processes. For compression in the first step each 8.times.8 block of data is compressed using a Discrete Cosine Transformation (DCT) which outputs 64 DCT coefficients, each representing a particular frequency. In the second step each DCT coefficient is scaled with a quantization value and entropy encoded. For decompression in the first step the 64 DCT coefficients are obtained by removing the entropy encoding and scaling with the inverse of the quantization value. In the second step each 8.times.8 block of data is recreated from the DCT coefficients using an Inverse Discrete Cosine Transformation (IDCT). However note that this algorithm is "lossy" and as a result the recreated 8.times.8 block of data may not be an exact match of its original. This algorithm is fully described in "JPEG Still Image Data Compression Standard" by Pennebaker and Mitchell, Van Nostrand Reinhold, 1993.

During compression after the DCT coefficients are calculated for each 8.times.8 block of an image, they are quantized (divided by an integer) to reduce their size and this often reduces a number of the coefficients to zero. The quantized coefficients are then entropy encoded. Two entropy schemes are known as Huffman and arithmetic, but both rely on the same data structure. In this structure each non-zero quantized DCT coefficient comprises: a 4 bit zero-run field which represents the number of zero quantized DCT coefficients which immediately preceded this one; a length field which indicates the number of bits required to store the DCT coefficient; and the DCT coefficient.

Figure 5:
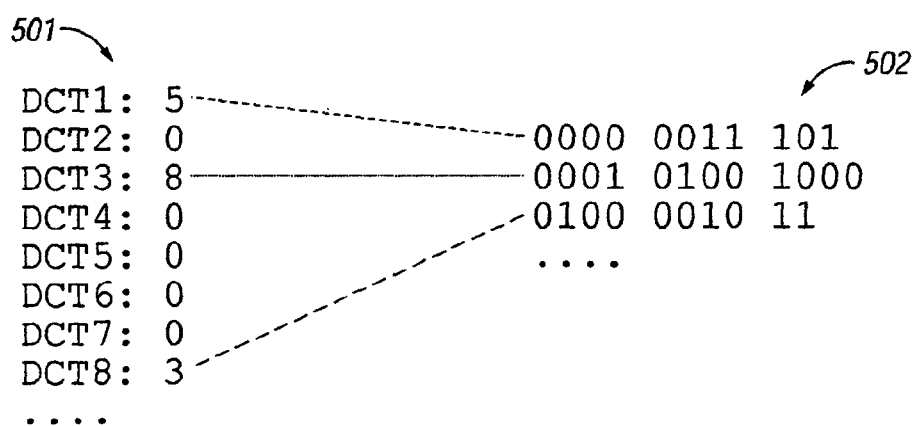
FIG. 5 illustrates example data stream contents used in partial decompression of a JPEG compressed data stream.

An example of this structure is illustrated in FIG. 5 for a sample 8 quantized DCT coefficients 501, in which DCT1, DCT3 and DCT8 have values 5, 8 and 3, respectively and all others have a value of 0. The entropy encoding 502 of these values is shown in a binary representation, each line comprising a DCT coefficient as indicated with dashed lines. For example the entropy encoding for DCT8 comprises: a 4 bit value (503) which is the number of zero DCT coefficients which immediately precede this one and is set to 4 (i.e.: DCT4, 5, 6 and 7); a 4 bit value (504) which is the number of bits used to store DCT8 and is set to 2; and a 2 bit value (505) which is the value of DCT8.

Of the 64 DCT coefficients which represent an 8.times.8 block, one is known as the DC coefficient and represents the average intensity of the 8.times.8 block. The other 63 are known as the AC coefficients and define the frequency terms which can be used to compute the actual pixels in the 8.times.8 block.

In the preferred embodiment of the present invention coverage data is determined for each 8.times.8 block of JPEG print data by obtaining its DC coefficient and using this as an average intensity of the 8.times.8 block. A coverage estimate for the entire print data is then calculated by calculating a coverage estimate for each block based on its determined average intensity, and summing the results.

To obtain the DC coefficients the JPEG data stream is partially decompressed by obtaining the quantized DC coefficients from the entropy encoding and de-quantizing them. For example, the DC coefficient is the first in each block and once a DC coefficient is found the next block is found from the entropy encoding by repeatedly reading the length fields of each DCT coefficient and skipping to the next non-zero coefficient until the next block is found.

Optionally, one or more of the AC coefficients might be also taken into account. Whilst the DC coefficient provides a good approximation, the toner usage in a block varies according to the pattern of the 8.times.8 block. For example if the block contains a small square in the middle and the rest is blank, the DC estimate will slightly undershoot the actual usage. As a result the AC coefficients can be used to detect toner distribution in a block and modify the estimate accordingly.

Note that an image may have one or more color planes. Accordingly the preferred embodiment of the present invention is applicable to a full range of images, from one bit per spot black and white all the way to the 32 bit (or more) full process color.

While the preferred embodiment explains the invention in the context of three very popular compression algorithms, it will be apparent to those skilled in the art that a number of other compression algorithms such as for example JBIG2 would lend themselves to the same approach.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In summary the present invention provides a method, apparatus and program product for calculating an estimate of the amount of toner coverage required for printing print data defined in a compressed data stream. The estimate is obtained with reduced processing by obtaining coverage data from a partially decompressed formed of the data stream and using this to obtain the coverage estimate, thus removing the need to do a full de-compression of the data stream. For example the coverage data is a count of toned pixels for at least one intensity level.

What is claimed is:

1. A method of operating a printing system, comprising:
   receiving a compressed Group 4 data stream comprising compressed Group 4 print data;
   performing a partial decompression of the compressed Group 4 print data by obtaining a runs format of the Group 4 data stream;
   determining coverage data for the Group 4 print data using the partially decompressed print data by determining a count of toned pixels from the runs format of the Group 4 data stream;
   estimating an amount of marking material to print the Group 4 print data using the determined coverage data; and
   storing the estimated amount of marking material in a memory.

2. The method of claim 1 wherein the coverage data comprises a number of pixels for each of a plurality of intensity levels.

3. The method of claim 2 wherein:
   the number of intensity levels in the plurality of intensity levels is based on a number of intensity levels indicated in the print data.

4. The method of claim 2 further comprising:
   determining an intensity level for a pixel based on the intensity level of the pixel and at least one adjacent pixel.

5. The method of claim 1 wherein the coverage data is determined for a plurality of color planes.

6. The method of claim 1 further comprising:
   using the estimate of an amount of marking material to determine a cost of printing the print data.

7. The method of claim 1 further comprising:
   using the estimate of an amount of marking material to determine if a predetermined print device is capable of printing the print data.

8. A data processing system comprising:
   at least one processor; and
   an interface and memory accessible to the at least one processor;
   wherein the interface receives a compressed Group 4 data stream comprising compressed Group 4 print data;
   wherein the at least one processor is operable to perform sub-processes of:
      partially decompressing the compressed Group 4 print data by obtaining a runs format of the Group 4 data stream;
      determining coverage data for the Group 4 print data using the partially decompressed print data by determining a count of toned pixels from the runs format of the Group 4 data stream;
      estimating an amount of marking material to print the Group 4 print data using the determined coverage data; and
      storing the estimated amount of marking material in the memory.

9. The data processing system of claim 8 wherein the coverage data comprises a number of pixels for each of a plurality of intensity levels.

10. The data processing system of claim 9 wherein:
    the number of intensity levels in the plurality of intensity levels is based on a number of intensity levels indicated in the print data.

11. The data processing system of claim 9 wherein the at least one processor is further operable to perform a sub-process of:
    determining an intensity level for a pixel based on the intensity level of the pixel and at least one adjacent pixel.

12. The data processing system of claim 8 wherein coverage data is determined for a plurality of color planes.

13. The data processing system of claim 8 wherein the at least one processor is further operable to perform a sub-process of:
    using the estimate of an amount of marking material to determine a cost of printing the data stream.

14. The data processing system of claim 8 wherein the at least one processor is further operable to perform a sub-process of:
    using the estimate of an amount of marking material to determine if a predetermined print device is capable of printing the data stream.

15. A computer program product comprising a non-transitory program storage medium readable by a computer, the medium embodying one or more programs of instructions executable by a computer to perform a method comprising:
    receiving a compressed Group 4 data stream comprising compressed Group 4 print data;
    performing a partial decompression of the compressed Group 4 print data by obtaining a runs format of the Group 4 data stream;
    determining coverage data for the Group 4 print data using the partially decompressed print data by determining a count of toned pixels from the runs format of the Group 4 data stream;
    estimating an amount of marking material to print the Group 4 print data using the determined coverage data; and
    storing the estimated amount of marking material in a memory.

16. The computer program product of claim 15 wherein coverage data comprises a number of pixels for each of a plurality of intensity levels.

17. The computer program product of claim 16, the method further comprising:
    determining an intensity level for a pixel based on the intensity level of the pixel and at least one adjacent pixel.

18. The computer program product of claim 15 wherein the coverage data is determined for a plurality of color planes.

19. The computer program product of claim 15, the method further comprising:
    using the estimate of an amount of marking material to determine a cost of printing the print data.

20. The computer program product of claim 15, the method further comprising:
    using the estimate of an amount of marking material to determine if a predetermined print device is capable of printing the print data.

* * * * *